United States Patent
Gyorog et al.

(10) Patent No.: US 10,450,043 B1
(45) Date of Patent: Oct. 22, 2019

(54) TROLLING MOTOR SYSTEM WITH MANUAL/ELECTRIC STEERING

(71) Applicant: Brunswick Corporation, Mettawa, IL (US)

(72) Inventors: Michael D. Gyorog, Fond du Lac, WI (US); Robert Tate, South Haven, MI (US); John Witte, Ada, MI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 15/986,384

(22) Filed: May 22, 2018

(51) Int. Cl.
*B60L 15/20* (2006.01)
*B63H 20/00* (2006.01)
*B63H 25/02* (2006.01)
*B63H 25/42* (2006.01)

(52) U.S. Cl.
CPC ........... *B63H 20/007* (2013.01); *B63H 25/02* (2013.01); *B63H 25/42* (2013.01); *B63B 2755/00* (2013.01)

(58) Field of Classification Search
CPC ...... B63H 20/007; B63H 25/02; B63H 25/42; B63H 2025/02; B63H 2025/42
USPC ........................................................ 440/6, 7
See application file for complete search history.

(56) References Cited

U.S. PATENT DOCUMENTS

| | | |
|---|---|---|
| 2,433,826 A | 1/1948 | Brown |
| 2,583,059 A | 1/1952 | Neville |
| 2,804,838 A | 9/1957 | Moser |
| 3,051,886 A | 8/1962 | Cadwallader |
| 3,511,208 A | 5/1970 | Woodruff |
| 3,606,858 A | 9/1971 | Edwards et al. |
| 3,807,345 A | 4/1974 | Peterson |
| 4,004,537 A | 1/1977 | Nilsson |
| 4,051,802 A | 10/1977 | Russell |
| 4,151,807 A | 5/1979 | Black, Jr. |
| 4,419,084 A | 12/1983 | Borst |
| 4,631,034 A | 12/1986 | Menne et al. |
| 4,669,987 A | 6/1987 | Schulte |
| 4,824,408 A | 4/1989 | Aertker et al. |
| 5,057,043 A | 10/1991 | Sugimoto et al. |
| 5,127,856 A | 7/1992 | Kabuto et al. |
| 5,171,173 A | 12/1992 | Henderson et al. |
| 5,171,174 A | 12/1992 | Mynster |
| 5,172,324 A | 12/1992 | Knight |
| 5,202,835 A | 4/1993 | Knight |
| 5,235,927 A | 8/1993 | Singh et al. |
| 5,240,445 A | 8/1993 | Aoki et al. |

(Continued)

OTHER PUBLICATIONS

Johnson Outdoors, "Minnkota Ulterra Bow-Mount Trolling Motor," owner's manual, 2016, pp. 1-62.

(Continued)

*Primary Examiner* — Daniel V Venne
(74) *Attorney, Agent, or Firm* — Andrus Intellectual Property Law, LLP

(57) ABSTRACT

A trolling motor system for a watercraft includes a trolling motor assembly coupled to the watercraft. A foot pedal is mechanically coupled to the trolling motor assembly such that mechanical inputs to the foot pedal cause movement of a moveable component of the trolling motor assembly. A steering motor is configured to steer the trolling motor assembly. The movement of the moveable component of the trolling motor assembly generates electrical inputs to the steering motor, thereby activating the steering motor to steer the trolling motor assembly.

20 Claims, 10 Drawing Sheets

(56) References Cited

U.S. PATENT DOCUMENTS

| | | |
|---|---|---|
| 5,244,426 A | 9/1993 | Miyashita et al. |
| 5,253,604 A | 10/1993 | Bohlin |
| 5,355,821 A | 10/1994 | Johnson |
| 5,386,368 A | 1/1995 | Knight |
| 5,465,633 A | 11/1995 | Bernloehr |
| 5,491,636 A | 2/1996 | Robertson et al. |
| 5,884,213 A | 3/1999 | Carlson |
| 6,126,497 A | 10/2000 | Stockton |
| 6,170,600 B1 | 1/2001 | Shimizu |
| 6,311,634 B1 | 11/2001 | Ford et al. |
| 6,325,684 B1 | 12/2001 | Knight |
| 6,325,685 B1 | 12/2001 | Knight et al. |
| 6,678,589 B2 | 1/2004 | Robertson et al. |
| 6,758,705 B1 | 7/2004 | Bechtel et al. |
| 6,790,110 B2 | 9/2004 | Ozawa |
| 6,892,661 B2 | 5/2005 | Kishi et al. |
| 7,465,202 B2 | 12/2008 | Takada et al. |
| 7,538,511 B2 | 5/2009 | Samek |
| 7,933,692 B2 | 4/2011 | Hiroshima |
| 8,221,175 B2 | 7/2012 | Mynster |
| 8,761,976 B2 | 6/2014 | Salmon et al. |
| 8,991,280 B2 * | 3/2015 | Wireman ............... B63H 25/10 114/144 R |
| 9,132,900 B2 | 9/2015 | Salmon et al. |
| 9,290,256 B1 | 3/2016 | Wireman et al. |
| 9,296,455 B2 | 3/2016 | Bernloehr et al. |
| 9,676,462 B2 | 6/2017 | Bernloehr et al. |
| 2007/0197107 A1 | 8/2007 | Lee |
| 2007/0232157 A1 * | 10/2007 | Lee ...................... B63H 20/007 440/6 |
| 2014/0260764 A1 * | 9/2014 | Wireman ............... B63H 25/10 74/496 |
| 2015/0151824 A1 * | 6/2015 | Wireman ............... B63H 25/10 440/49 |
| 2017/0205828 A1 | 7/2017 | Estabrook |

OTHER PUBLICATIONS

Johnson Outdoors, "Minnkota Ultrex Bow-Mount Trolling Motor," owner's manual, 2016, pp. 1-64.

Mercury Marine, "Xi5 Wireless Edition Operation Maintenance Installation Warranty Manual," owner's manual, 2013, pp. 1-38.

Marinetech, "Panther 55-0101A Electro Steer Saltwater Model 101A," specification sheet, available at least since 2013.

* cited by examiner

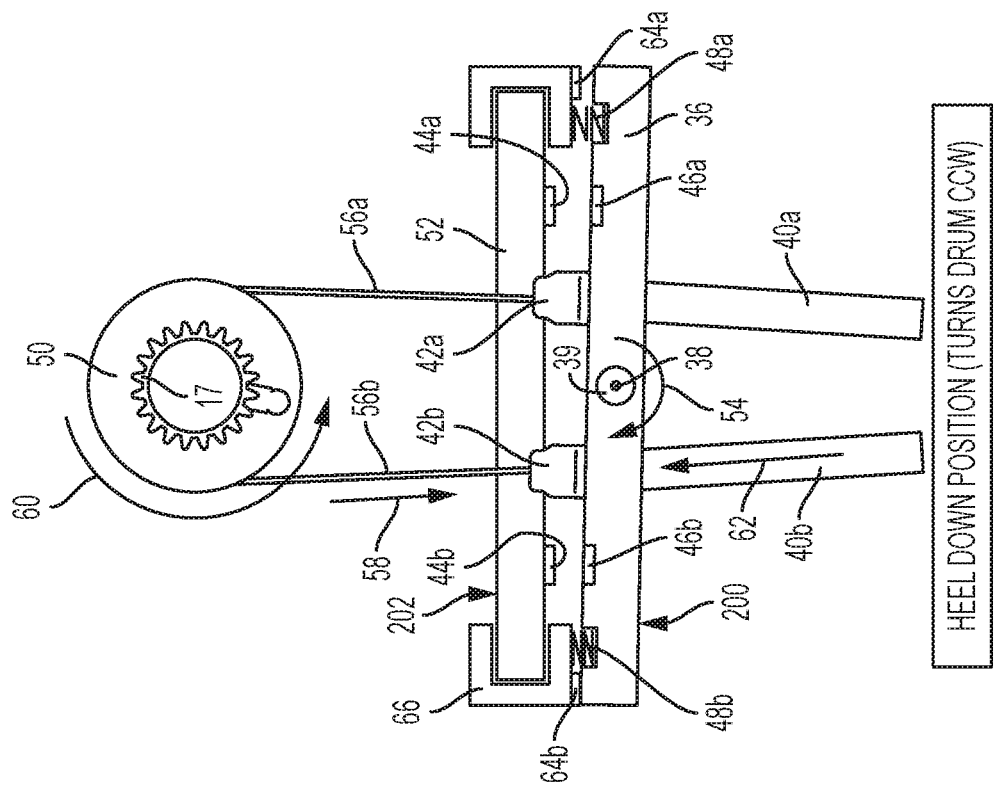
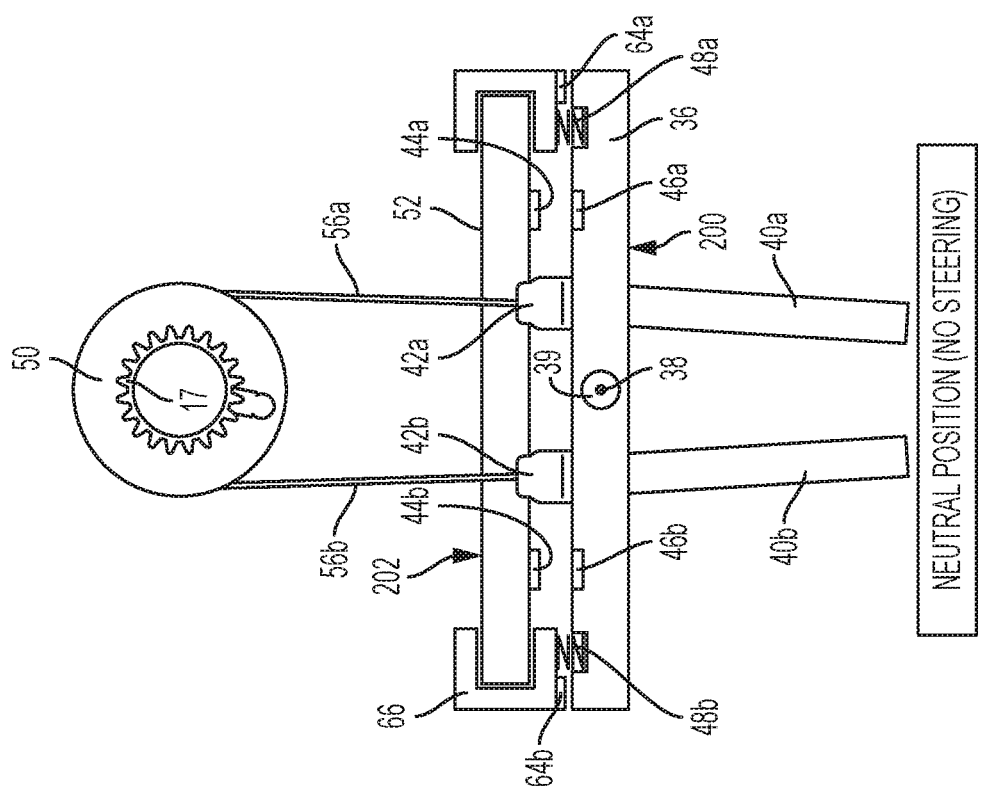

TOE DOWN POSITION (TURNS DRUM CW)

NEUTRAL POSITION (NO STEERING)

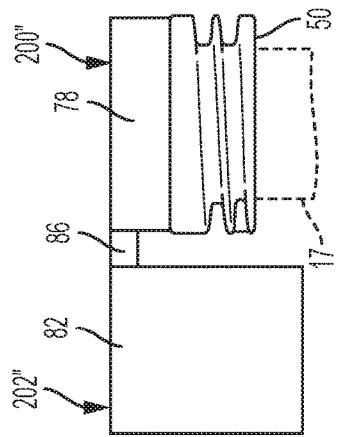
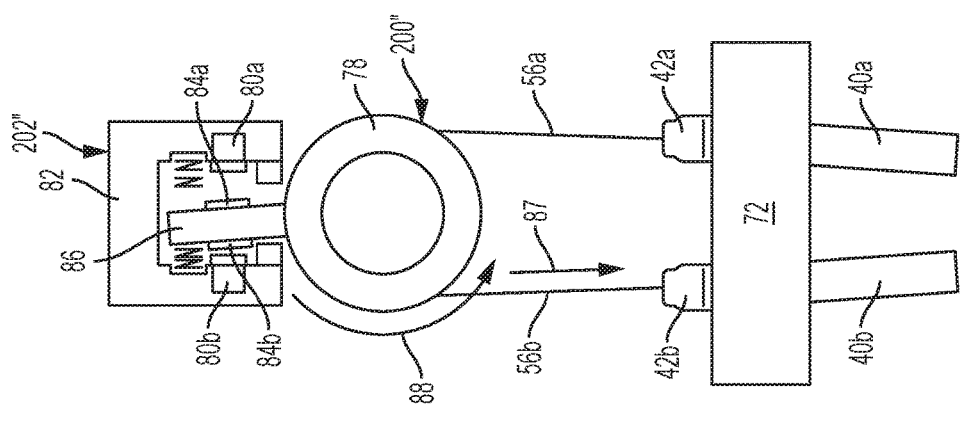
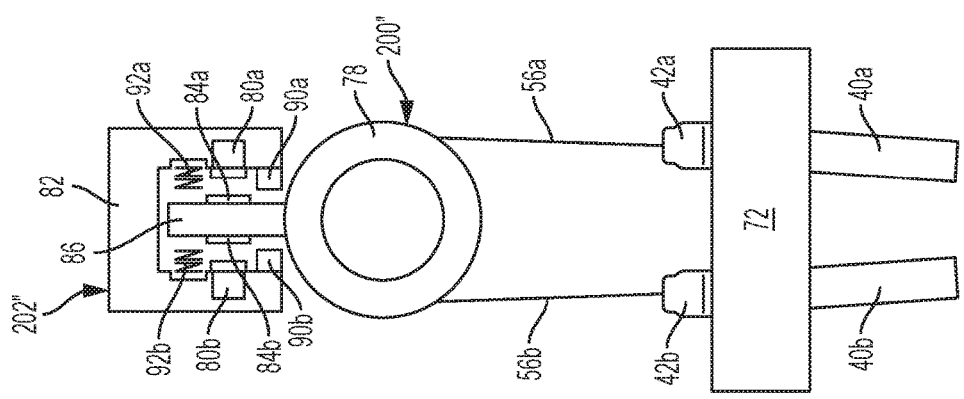

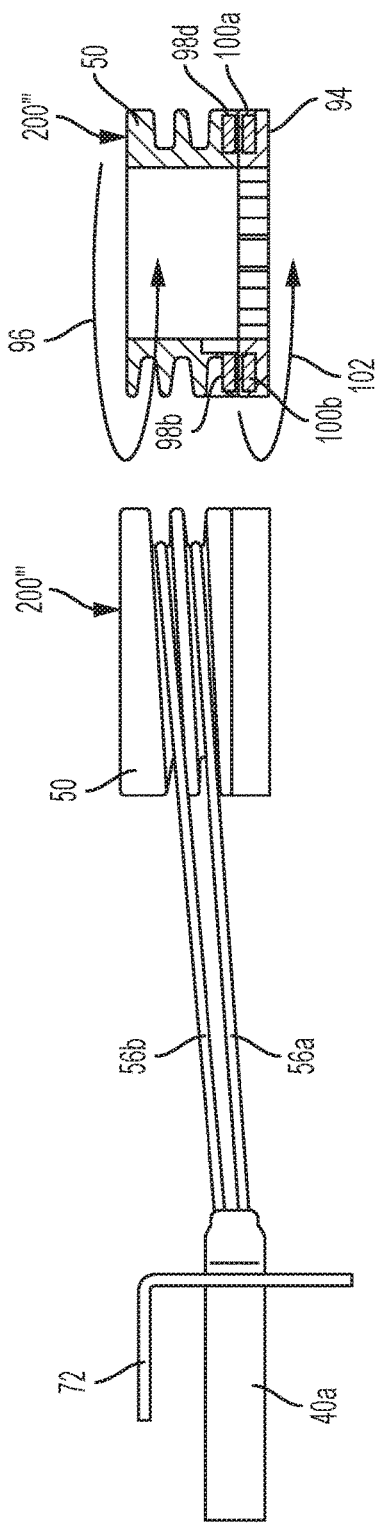
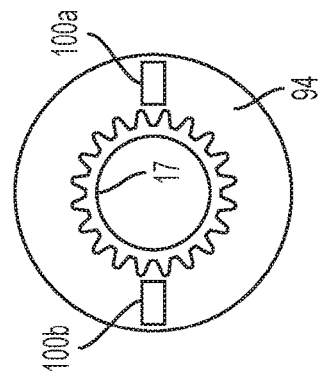
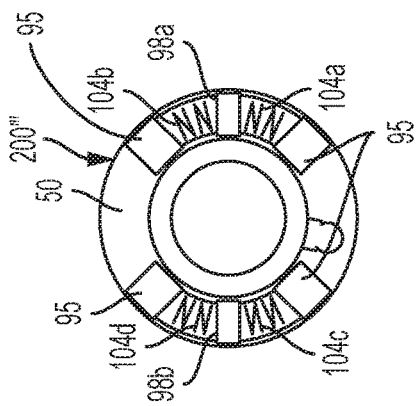
FIG. 8A
FIG. 8B
FIG. 8C

TROLLING MOTOR SYSTEM WITH MANUAL/ELECTRIC STEERING

FIELD

The present disclosure relates to trolling motor systems, and more specifically to steering systems for trolling motor systems.

BACKGROUND

U.S. Pat. No. 9,290,256, which is hereby incorporated by reference herein, discloses a steering system for a trolling motor, which includes a mechanical steering system having a mechanical steering input device and a mechanical linkage extending from the mechanical steering input device to a steering shaft of the trolling motor. Movement of the mechanical steering input device causes movement of the mechanical linkage, which in turn causes rotation of the steering shaft. An electromechanical actuation system is provided that is configured to be coupled to the mechanical steering system. A controller is in signal communication with the electromechanical actuation system and provides steering signals thereto. The electromechanical actuation system selectively actuates the mechanical steering system so as to rotate the steering shaft according to the steering signals provided by the controller. A method for steering a trolling motor is also provided.

U.S. Pat. No. 9,676,462 discloses a trolling motor system with power steering and associated methods. The trolling motor system includes a power steering module mounted to a mount of the trolling motor system. The power steering module is operable to rotate a trolling motor assembly of the trolling motor system about an axis thereof based upon at least one of a mechanical or an electrical input.

SUMMARY

This summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a trolling motor system for a watercraft includes a trolling motor assembly coupled to the watercraft. A foot pedal is mechanically coupled to the trolling motor assembly such that mechanical inputs to the foot pedal cause movement of a moveable component of the trolling motor assembly. A steering motor is configured to steer the trolling motor assembly. The movement of the moveable component of the trolling motor assembly generates electrical inputs to the steering motor, thereby activating the steering motor to steer the trolling motor assembly.

According to another example of the present disclosure, a trolling motor assembly comprises a housing containing a steering motor, a steering shaft coupled to and configured to be rotated by the steering motor, and a lower unit coupled to an end of the steering shaft and configured to rotate with the steering shaft. The housing contains a moveable component that is actuated by mechanical inputs from a foot pedal that is configured to be coupled to the trolling motor assembly. Actuation of the moveable component generates electrical inputs to the steering motor, thereby activating the steering motor to rotate the steering shaft and the lower unit.

BRIEF DESCRIPTION OF THE DRAWINGS

The present disclosure is described with reference to the following Figures. The same numbers are used throughout the Figures to reference like features and like components.

FIG. 4A is a schematic showing a portion of an embodiment of a steering system of the trolling motor system in a first position.

FIG. 4B shows the portion of the steering system in an alternative position.

FIG. 7A illustrates another embodiment of a portion of a steering system for the trolling motor system in a first position.

FIG. 7B shows the portion of the steering system in a second position.

FIG. 7C shows a side view of part of the portion of the steering system of FIGS. 7A and 7B.

FIG. 8A illustrates a side view of another embodiment of a portion of a steering system for the trolling motor system.

FIG. 8B illustrates a top view of part of the portion of the steering system of FIG. 8A.

FIG. 8C shows a top view of another part of the portion of the steering system of FIG. 8A.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed.

Figure 1:
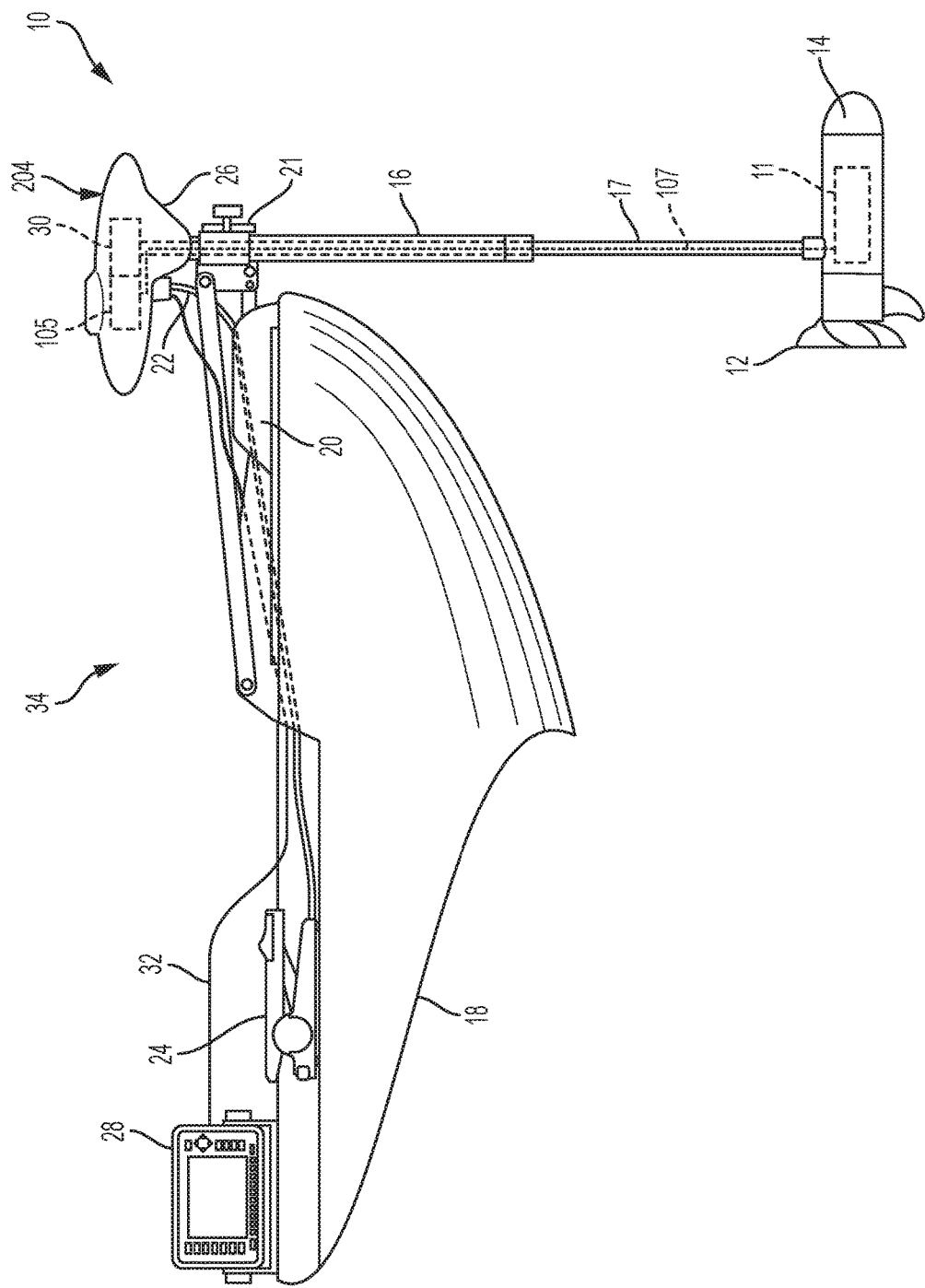
FIG. 1 illustrates a watercraft equipped with a trolling motor system.

FIG. 1 illustrates an example of a trolling motor assembly 10, which is removably coupled to a watercraft 18 by way of a mounting bracket 20 connected to the watercraft 18. The trolling motor assembly 10 includes an electric motor 11 coupled to and configured to rotate a propeller 12, both of which are held by a lower unit 14 of the trolling motor assembly 10. In one example, the electric motor 11 is a brushed DC electric motor that is directly connected to the propeller shaft. A support column 16 is coupled to the mounting bracket 20 by way of a depth collar 21, which allows for vertical adjustment of the trolling motor assembly 10 with respect to the mounting bracket 20. The support column 16 holds a steering shaft 17 from which the lower unit 14 is suspended. A control head 26 is mounted to the upper end of the support column 16, at an opposite end of the steering shaft 17 from the lower unit 14, and houses a steering motor 30.

Figure 9:
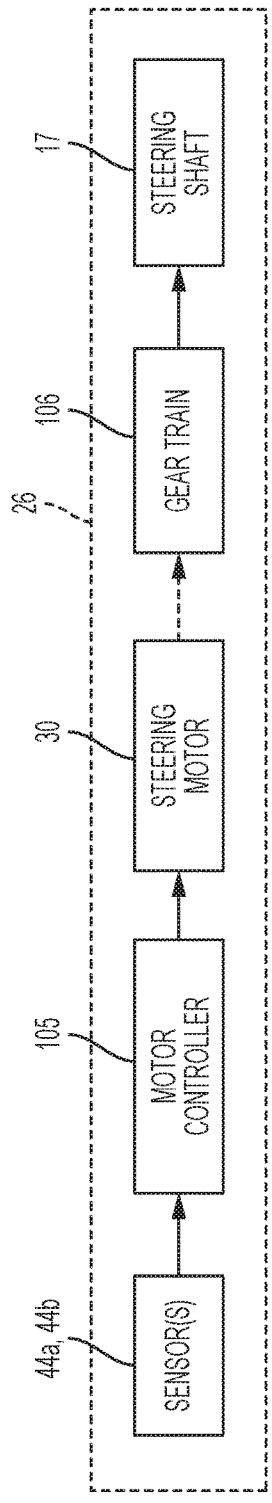
FIGS. 9-12 schematically illustrate examples of different layouts for the steering systems for the trolling motor assembly described herein.

In operation, the speed, rotational direction, and steering of the trolling motor assembly 10 are controlled by a foot pedal 24 connected to the control head 26 of the trolling motor assembly 10 by a cable assembly 22. The cable assembly 22 includes electrical wires/cables for communicating electrical inputs, such as speed and forward/reverse directional commands, to the electric motor 11 in the lower unit 14 by way of a motor controller (not shown herein; see FIGS. 9-11). The cable assembly 22 also mechanically couples the foot pedal 24 to the trolling motor assembly 10, and includes cables, such as Bowden cables, for transmitting mechanical inputs from the foot pedal 24 to the control head 26, as will be described further herein below. The cable assembly 22 may also include a sheath that covers the electrical wires/cables and mechanical Bowden cables and protects them from the elements and mechanical damage.

The watercraft 18 may also be equipped with an electronic navigation unit 28, which can be a fish finder, depth finder, chart plotter, or the like. The electronic navigation unit 28 can provide motor speed, motor direction, and steering control commands to the trolling motor assembly 10 by way of a cable assembly 32. In contrast to the cable assembly 22, the cable assembly 32 contains only electrical wires/cables for communicating with the motor controller and/or steering motor 30. In another example, the electronic navigation unit 28 communicates wirelessly with the trolling motor assembly 10. In other examples, the trolling motor assembly 10 is controlled by way of a hand-held remote control, which can be wired/cabled to the trolling motor assembly 10 or can be wireless.

The motor controller 105 (see also FIGS. 9-11) can be located in the control head 26, the lower unit 14, or another housing of the trolling motor assembly 10 (depending on the design thereof), and is electrically connected to the electric motor 11 by way of a power supply cable and/or a control signal cable 107. By way of the electrical connection provided by the power supply cable, the motor controller 105 can control a speed and direction (forward or reverse) of the electric motor 11 and thus a speed and direction of the propeller 12 driveably coupled thereto. The speed and direction inputs can be originated at any of the foot pedal 24, the electronic navigation unit 28, or the hand-held remote control, as is known to those having ordinary skill in the art. Additionally or alternatively, a smart device, such as a phone or a tablet, can be used to control the trolling motor assembly 10.

Traditional cable-steer trolling motor systems transmit mechanical steering inputs to the steering shaft 17 and lower unit 14 through Bowden cables wrapped around a rotating drum, which is coupled to the steering shaft 17. Such systems typically utilize two opposed Bowden cables, which rotate the drum and steering shaft 17 in opposite directions depending on which cable has a tensile force applied thereto. The user typically applies this tensile force through the foot pedal 24, which includes a foot pad that pivots about a horizontal axis and pulleys that wind or unwind the opposite ends of the Bowden cables as the foot pad pivots. The user applies a force to rotate the foot pad and is able to steer the motor left or right, depending on which side of the foot pad is pressed. The cable assembly 22 serves to transmit the steering forces to the drum, but also keeps the foot pedal 24 synchronized with the steered direction of lower unit 14 at all times. Therefore, the user always knows in which direction the lower unit 14 is oriented by simply sensing the orientation of the pad on the foot pedal 24. However, one disadvantage of this type of purely mechanical steering system is that water flowing past the lower unit 14 and forces generated by the propeller 12 tend to apply a torque to the lower unit 14, especially when the lower unit 14 is not pointed directly into the direction of water flowing past the watercraft 18, which causes the steered direction of the trolling motor assembly 10 to drift if the user does not keep his or her foot on the foot pedal 24 to maintain the pad's orientation.

Conversely, traditional electric-steer trolling motor systems typically do not require such a mechanical steering input, but rather an electrical input that instructs the steering motor 30 to steer the steering shaft 17 at a fixed rate of rotation. The foot pedal on a traditional electric-steer trolling motor system provides only momentary steering inputs for the duration of time the foot pedal is depressed. The steering motor 30 will rotate the steering shaft 17 in a direction that corresponds to the direction the foot pedal is rotated with the user's foot. Upon removing a steering force from the foot pedal, the foot pedal pad returns to the neutral position, so the foot pedal is not synchronized with the steered position of the lower unit 14. The user must look at the trolling motor assembly 10 to determine in which direction the trolling motor assembly 10 is pointed, which distracts from the primary focus of fishing.

Benefits of electric-steer trolling motor systems are that they allow for the addition of autopilot, anchor mode, and/or waypoint tracking features available via the electronic navigation unit 28 or hand-held remote control, as they are fitted with a power steering motor that accepts purely electrical inputs. Electric-steer trolling motor systems also have the advantage of maintaining the trolling motor assembly's direction when the user removes his or her foot from the foot pedal, because the steering motor 30 provides a holding torque to the steering shaft 17, which prevents water flow and propeller forces from changing the direction of the lower unit 14 without further intentional user inputs.

As described above, steering a trolling motor assembly 10 mechanically with a traditional cable-steer system provides the user with real-time mechanical feedback and steering rate control; however, a traditional electric-steer system does not provide such feedback, which is desired when steering a trolling motor assembly 10 by foot.

Through research and development, the present inventors have developed a manual/electric-steer trolling motor system. Such a system achieves the desired lower unit 14 position synchronization to the user's foot pedal orientation. It also allows for other electric-steer advantages, such as autopilot capability and the ability to maintain a steering direction of the lower unit 14 without requiring that the user constantly keep his or her foot on the foot pedal. Through the use of traditional Bowden cables between the foot pedal 24 and the trolling motor assembly 10, the present system is also able to provide the user with the under-foot steering feel and mechanical feedback of a traditional cable-steer system. Such a manual/electric-steer system is described in further detail herein below.

Returning to FIG. 1, illustrated therein is a trolling motor system 34 for a watercraft 18. The trolling motor system 34 includes a trolling motor assembly 10 coupled to the watercraft 18. A foot pedal 24 is mechanically coupled to the trolling motor assembly 10 such that mechanical inputs to the foot pedal 24 cause movement of a moveable component of the trolling motor assembly 10, as will be described further herein below. A steering motor 30 is configured to steer the trolling motor assembly 10. Movement of the moveable component of the trolling motor assembly 10 generates electrical inputs to the steering motor 30, thereby activating the steering motor 30 to steer the trolling motor assembly 10. The trolling motor assembly 10 includes a control head 26, a lower unit 14, and a steering shaft 17 connecting the control head 26 to the lower unit 14. The steering motor 30 is coupled to the steering shaft 17, as shown by the dashed lines, and is configured to rotate the steering shaft 17 and thereby rotate the lower unit 14. For example, an output shaft of the steering motor 30 can be coupled to the steering shaft 17 by way of a gear train, as known to those having ordinary skill in the art. Additionally, as noted herein above, the foot pedal 24 is mechanically coupled to the steering shaft 17, such as by way of Bowden cables in cable assembly 22, which are wound around a cable drum that is coupled to the steering shaft 17. Details of how steering by the steering motor 30 versus steering by the Bowden cables and cable drum are accomplished will be described herein below.

As noted, the trolling motor assembly 10 includes the control head 26. In each of the examples described herein below, the above-noted moveable component is located inside the control head 26, i.e., under the cover of the control head 26. However, it should be understood that the moveable component could instead be located outside of the control head 26, such as in a housing 108 attached to the outer surface of the control head 26 or in an intermediate housing 112 between the foot pedal 24 and the control head 26.

Figure 2:
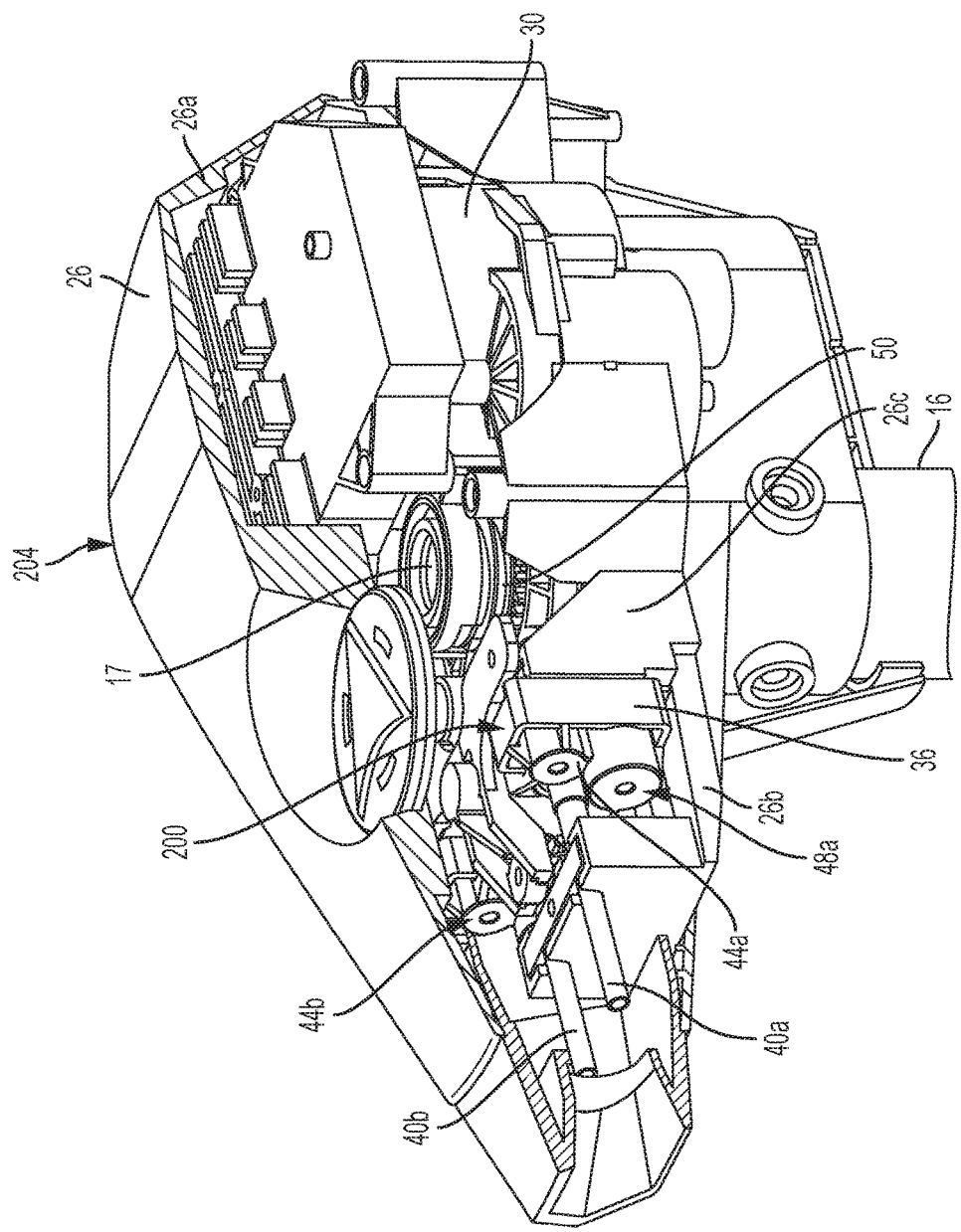
FIG. 2 illustrates a partial cross-sectional view of a portion of the trolling motor system of FIG. 1.
Figure 3:
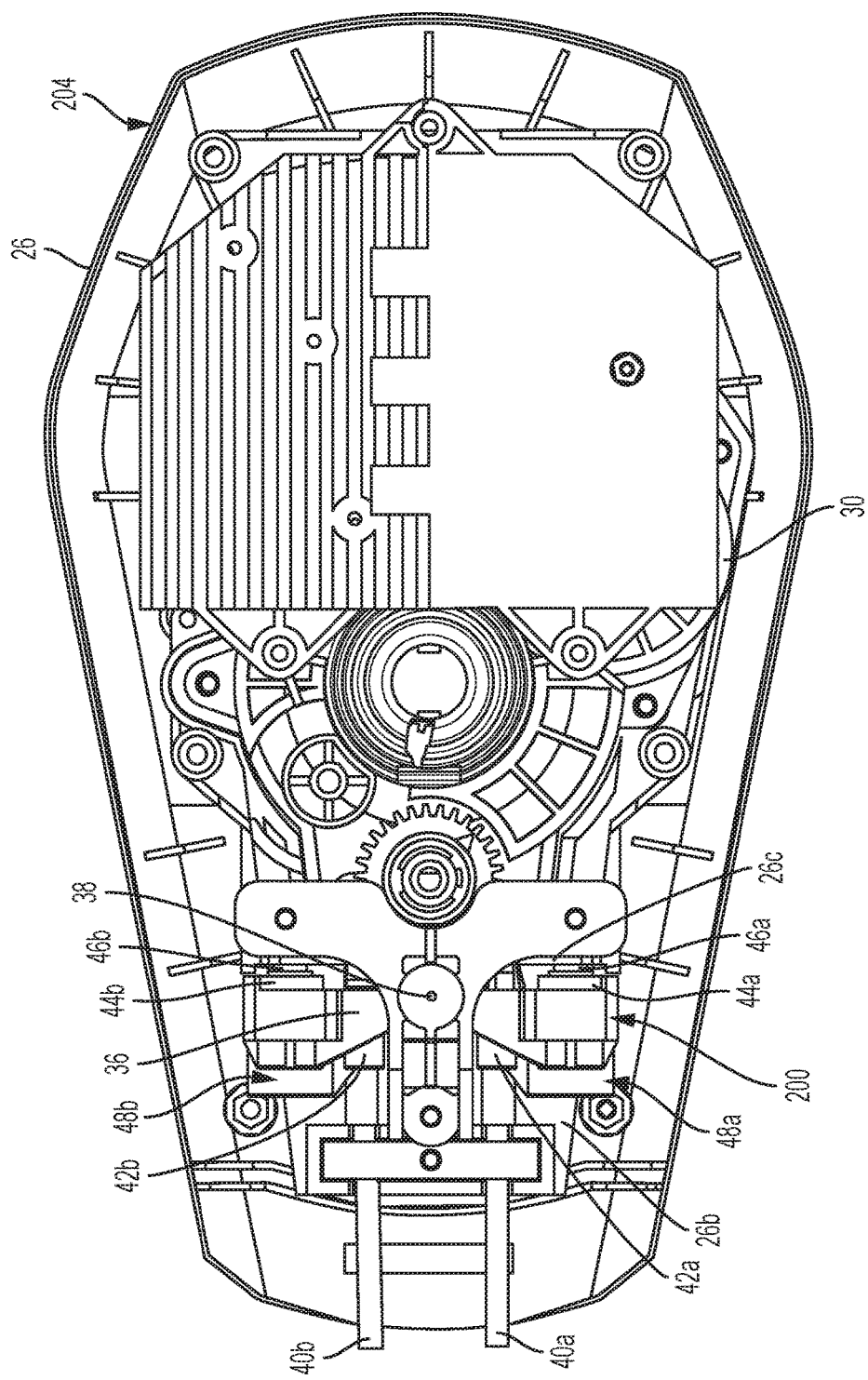
FIG. 3 illustrates a top view of the portion of the trolling motor system of FIG. 2.

Turning to FIGS. 2 and 3, a partial cutaway view and a view with the upper cover 26a of the control head 26 removed are shown. In this example, the moveable component 200 comprises a bracket 36 that is coupled to the control head 26 and moveable with respect to the control head 26. For example, the bracket 36 can be directly nested in the inner compartment of the control head 26 on a base block 26b and coupled to and pivotable with respect thereto by way of a pivot pin 39 (see FIGS. 4A-5B) having a pivot axis 38. Bowden cables 40a, 40b from cable assembly 22 are coupled to the bracket 36 by way of fittings 42a, 42b. Tension placed on one or the other of the Bowden cables 40a, 40b by way of the user rotating the foot pad on the foot pedal 24 will cause the bracket 36 to rotate about pivot axis 38. Thus, the trolling motor system 34 includes a cable 40a, 40b that couples the foot pedal 24 to the bracket 36, wherein movement of the cable 40a, 40b results in movement of the bracket 36. The trolling motor system 34 also includes sensors 44a, 44b in the control head 26 that generate electrical inputs to the steering motor 30 based on a position of bracket 36. In one example, the sensors 44a, 44b may be Hall Effect sensors, and may interact with magnets 46a, 46b, also in the control head 26. A set of springs 48a, 48b may also be provided to return the bracket 36 to a rest position when tension is released from the cable 40a or 40b.

FIG. 2 also shows the cable drum 50, which is coupled (e.g., keyed, splined, or geared) to the steering shaft 17. Although not shown in FIGS. 2 and 3, the example of FIGS. 4A and 4B shows how the cables 40a and 40b couple the foot pedal 24 to the cable drum 50, and how movement of the cables 40a, 40b results in rotation of the cable drum 50.

FIG. 4A shows a portion of another example of a steering system in which the moveable component 200 also comprises the bracket 36, which is shown merely schematically herein. Also shown is a stationary component 202, here, sensor board 52, with respect to which the moveable component 200 (bracket 36) moves. A sensor, such as Hall Effect sensors 44a, 44b noted herein above, can be located on one of the stationary component 202 (sensor board 52) and the moveable component 200 (bracket 36). Note that in FIGS. 4A and 4B the sensors 44a, 44b are shown as being connected to the stationary sensor board 52, but could instead be connected to the moveable bracket 36, as shown in FIGS. 2 and 3. Magnets 46a and 46b are provided on the other of the stationary component 202 (sensor board 52) and the moveable component 200 (bracket 36). Again, note that the placement of the magnets 46a, 46b herein is the reverse of what is shown in FIGS. 2 and 3, in which the magnets 46a, 46b are provided on a stationary component 26c. As is known, a Hall Effect sensor will generate electrical signals based on its proximity to the magnet 46a or 46b. Thus, the Hall Effect sensors 44a, 44b are used to generate the electrical inputs to the steering motor 30 based on relative positions of the Hall Effect sensors 44a, 44b and magnets 46a, 46b.

FIG. 4A shows the bracket 36 in a neutral position, in which no mechanical input from the foot pedal 24 is provided. In contrast, FIG. 4B shows the system in an instance where the bracket 36 is rotated clockwise as shown by the arrow 54. This is due, for example, to the user rotating the foot pad of the foot pedal 24 to a heel-down position, which places tension on a cable strand 56b within cable conduit 57a of the Bowden cable 40b, which causes rotation of the cable drum 50 in a counterclockwise direction, as shown by the arrow 60. Tension on the cable strand 56b of the Bowden cable 40b creates a reactive force, shown by the arrow 62, acting at fitting 42b, which rotates the bracket 36 in the clockwise direction as shown by the arrow 54. This causes the magnet 46b to move closer to the sensor 44b, while the magnet 46a moves further from the sensor 44a. The readings from one or both of the sensors 44a, 44b are then provided as electrical inputs to the steering motor 30, which rotates the steering shaft 17 in the counterclockwise direction by way of the gear assembly, as shown by the arrow 60. The readings from the sensor(s) can be interpreted by the motor controller, or can be manipulated by components connected to the sensor board 52, before being input to the steering motor 30.

Note that movement of the bracket 36 is very slight, and is only on the order of a few millimeters. Thus, steering of the trolling motor assembly 10, more specifically lower unit 14, is not in this instance accomplished by the tension transmitted through the Bowden cable 40b, but rather is accomplished by the steering motor 30, which acts in response to the electrical inputs generated by readings from the sensors 44a, 44b. Nonetheless, if the user applies pressure to the foot pedal 24 with so much force that the electronics and/or steering motor 30 are not able to keep up with the applied torque on the cable drum 50 (and thus steering shaft 17) by way of the cable assembly 22, the steering shaft 17 may indeed be rotated by way of the purely mechanical input from the foot pedal 24.

Note that because the cable assembly 22 is mechanically coupled to the cable drum 50 (by way of Bowden cables 40a, 40b), which cable drum 50 is in turn mechanically coupled to the steering shaft 17, any rotation of the steering shaft 17 imparted by the steering motor 30 via the gear assembly will be transferred back through the cable drum 50 and the Bowden cables 40a, 40b to the foot pedal 24. Thus, the user will be able to feel the mechanical feedback from the steering of the trolling motor assembly 10, and will know which way the lower unit 14 is steered without having to look at the trolling motor assembly 10.

Also pictured in FIGS. 4A and 4B are the springs 48a, 48b, which return the bracket 36 to its rest position (FIG. 4A) after tension is released from the Bowden cable 40a or 40b. Hard stops 64a, 64b are also shown as being attached to a stationary mounting structure 66, which may be integral with or attached to the interior molding of the control head 26. The hard stops 64a, 64b limit the travel of the bracket 36 as it pivots about axis 38, which takes up for some of the steering abuse load imparted by way of the foot pedal 24 and Bowden cables 40a, 40b. Note that the hard stop 64a, 64b need not be separate components, but instead could be part of the stationary mounting structure 66. The springs 48a, 48b could be contained within spring stack housings, as shown in FIGS. 2 and 3.

Now turning to FIGS. 5A and 5B, another embodiment of a portion of a steering system for the trolling motor assembly 10 will be described. In this embodiment, the Bowden cables 40a, 40b have been modified and thus are represented by 40a', 40b'. Such modification may be by way of adding a radius or curvature to the Bowden cables 40a', 40b' that exists when the cables 40a', 40b' are not under tension (FIG. 5A). This allows the respective cable 40a' or 40b' to straighten and the bracket 36 to pivot when tension is applied to the respective cable 40a' or 40b' by way of pressure on the foot pad of the foot pedal 24. For example, referring to FIG. 5B, when tension is applied to Bowden cable 40b' by placing the foot pedal 24 in the heel-down position, tension in the direction of arrow 58 on cable strand 56b causes a reaction force as shown at 62 acting at fitting 42b, which causes Bowden cable 40b' to stretch such that the radius or curvature is no longer present. This movement or play in the Bowden cable 40b' (or similarly in cable 40a' were an opposite toe-down force to be applied at foot pedal 24) provides more relative motion between the bracket 36 and sensor board 52, as bracket 36 rotates about axis 38 in the direction of arrow 54. Subsequent interactions between the sensors 44a, 44b and magnets 46a, 46b and generation of input signals to the steering motor 30 are the same as that described herein above with respect to FIGS. 4A and 4B, and will not be described further herein.

Figure 5B:
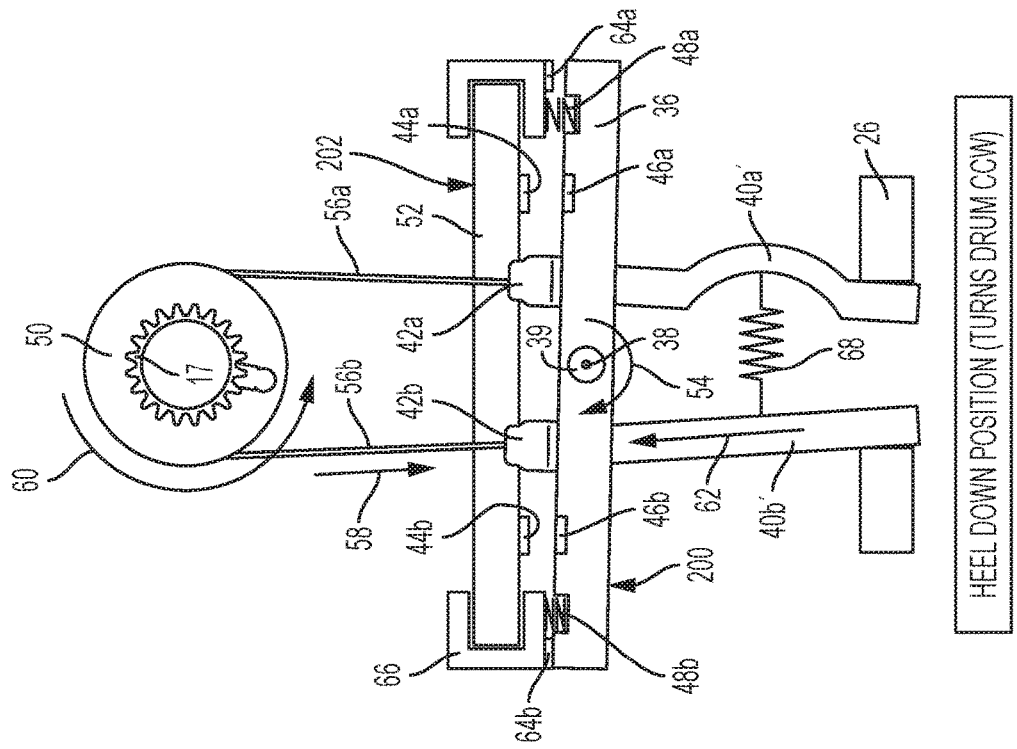
FIG. 5B shows the portion of the steering system in a second position.
Figure 5A:
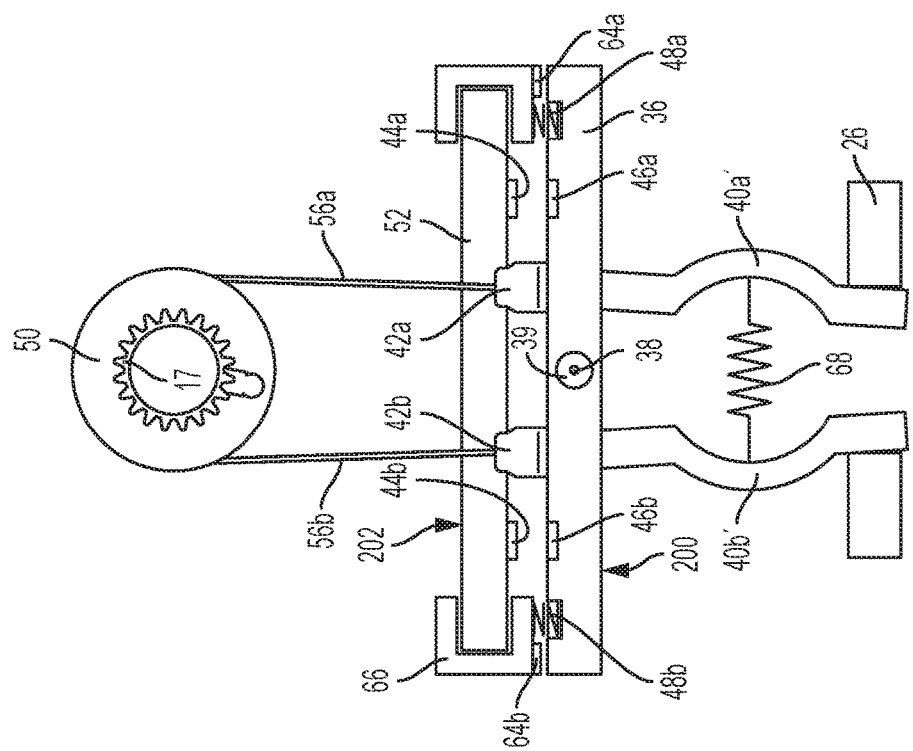
FIG. 5A illustrates another embodiment of a portion of a steering system for the trolling motor system in a first position.

A spring 68 is shown schematically in FIGS. 5A and 5B to indicate the spring-like play in the Bowden cables 40a', 40b'. Note, however, that an actual spring need not be provided here. Additionally, the conduits 57a', 57b' of the Bowden cables 40a', 40b', instead of having the noted radius or curvature, could instead be made of a molded, flexible material that is able to stretch and contract when placed under tension and compression. The cables 40a', 40b' could instead be ribbed inside the control head 26 or clamped at the control head housing 204 (FIGS. 1-3). A portion of the control head 26 is shown schematically at the bottom of each drawing, to show that the tension or compression of the Bowden cables 40a', 40b' may occur between the bracket 36 and the control head 26, thus confining the movement of the Bowden cables 40a', 40b' to a short, enclosed space.

Figure 6B:
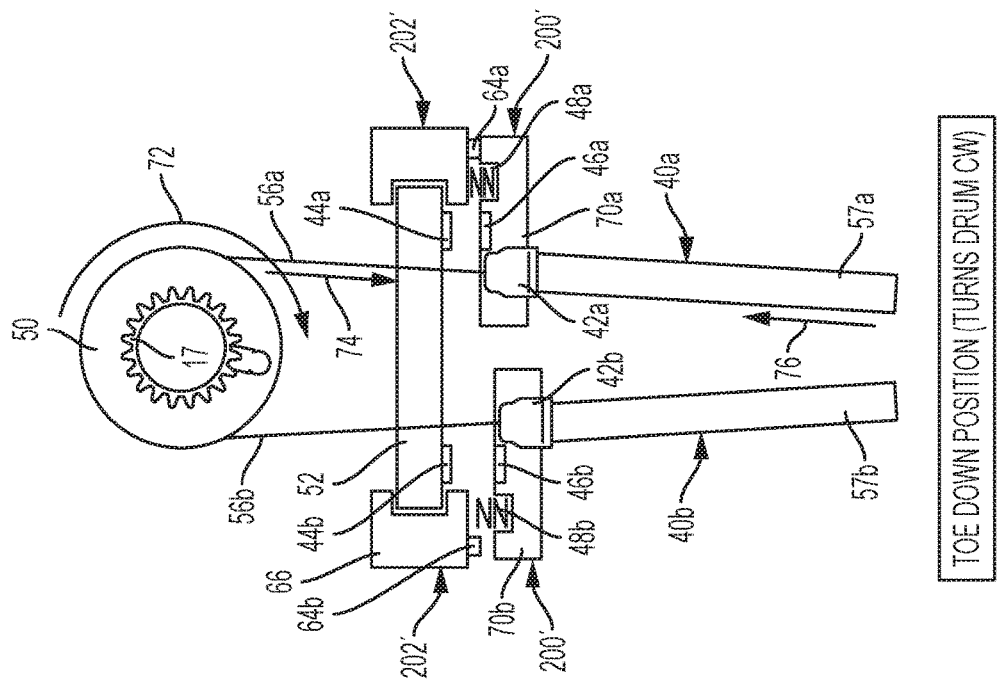
FIG. 6B shows the portion of the steering system in a second position.
Figure 6A:
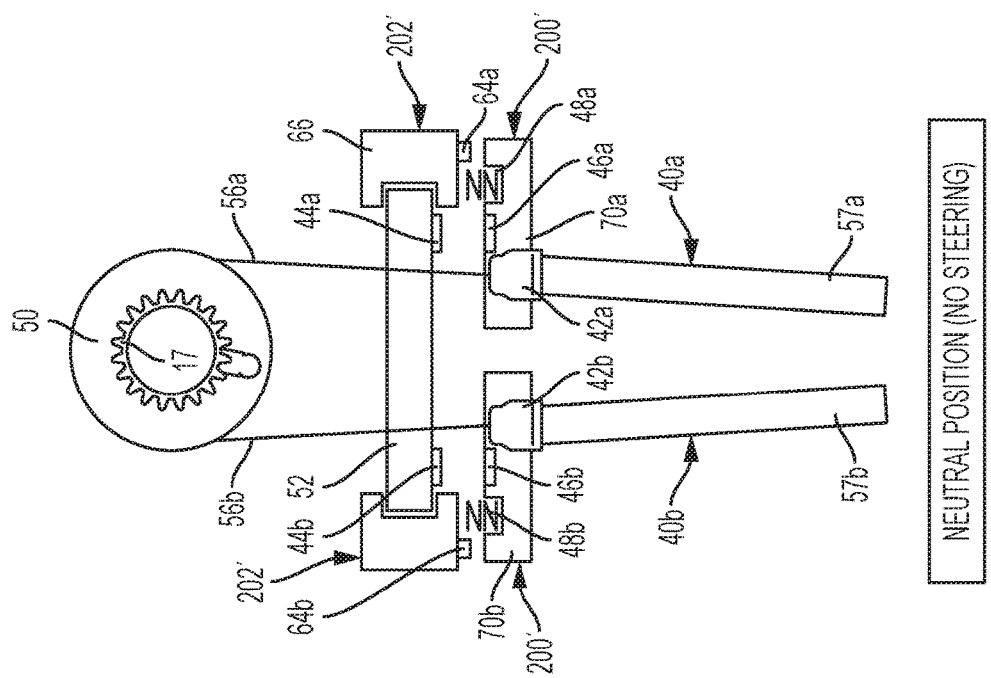
FIG. 6A illustrates another embodiment of a portion of a steering system for the trolling motor system in a first position.

FIGS. 6A and 6B show yet another example of a portion of a steering system for the trolling motor assembly 10. Here, the rotatable bracket 36 of the prior embodiments no longer exists, and instead, two separate brackets 70a, 70b are provided. Each bracket 70a, 70b is the moveable component 200' in this example. The bracket 70a holds a magnet 46a, and the bracket 70b holds a magnet 46b. The sensor board 52 is again held by a stationary component 202' (mounting structure 66), and holds sensors 44a, 44b. Similar to the previous embodiments, hard stops 64a, 64b and springs 48a, 48b are provided, for the same purposes as described herein above.

FIG. 6A shows the system at rest, when no mechanical steering input is provided from foot pedal 24. The brackets 70a, 70b are horizontally aligned, and the sensors 44a, 44b are equidistant from the magnets 46a, 46b. As shown in FIG. 6B, in contrast to the prior examples, the user has forced the foot pad of foot pedal 24 in a toe-down position, which places tension in the direction of arrow 74 on cable strand 56a within cable conduit 57a of Bowden cable 40a. Such tension causes a reaction force 76 to be applied at cable end fitting 42a, which tends to move bracket 70a toward mounting structure 66. Movement of the magnet 46a with bracket 70a toward sensor 44a (i.e., out of the neutral position shown in FIG. 6A) generates a reading that becomes an electrical input signal to the steering motor 30. The steering motor 30 thereafter steers the steering shaft 17 in a clockwise direction, as shown by arrow 72. Thus, as described above, steering is accomplished by way of the steering motor 30 rather than the Bowden cables 40a, 40b, unless input to the foot pedal 24 is of a high enough and sudden enough force that the steering motor 30 cannot react in time.

Now turning to FIGS. 7A to 7C, in a different example, the moveable component 200" of the trolling motor assembly 10 comprises a rotatable drum 78 that is coupled to and rotates with the steering shaft 17. A sensor (such as sensors 80a, 80b) in the control head 26 generates the electrical inputs to the steering motor 30 based on a position of the rotatable drum 78. The sensors 80a, 80b are attached to a sensor board 82, which is stationary with respect to control head 26 (i.e., the sensor board 82 is a stationary component 202"), and interact with magnets 84a, 84b, which are connected to a shaft 86 extending from rotatable drum 78. Hard stops 90a, 90b and springs 92a, 92b are provided for the same purposes described with respect to the embodiments noted herein above. FIG. 7A shows the system in a rest position, with no steering input applied to the foot pedal 24. As shown in FIG. 7C, the rotatable drum 78 is an upper drum coupled by way of a friction fit to the lower cable drum 50, around which cable strands 56a, 56b of Bowden cables 40a, 40b are wound. Referring to FIG. 7B, as cable drum 50 is moved slightly due to tension on cable strand 56b, as shown by the arrow 87, cable drum 50 is rotated slightly in the counterclockwise direction, as shown by the arrow 88. By way of the friction fit, rotatable drum 78 is also rotated slightly in the counterclockwise direction, as shown by the arrow 88, thus moving magnet 84b on shaft 86 closer to sensor 80b, and magnet 84a further away from sensor 80a. Readings from the sensors 80a and 80b are thereafter used to generate input signals to the steering motor 30, which rotates the steering shaft 17 in the counterclockwise direction shown by arrow 88. Such rotation of steering shaft 17 is transmitted to cable drum 50 (see FIG. 7C), which provides mechanical feedback to foot pedal 24 via Bowden cables 40a, 40b.

FIGS. 8A to 8C illustrate yet another example in which the moveable component 200''' comprises a rotatable drum. Here, as shown in FIG. 8A, the rotatable drum is upper cable drum 50, which is rotated by way of tension on cable strand 56a or 56b transmitted through Bowden cable 40a or 40b. In response to movement of the foot pad on foot pedal 24, cable drum 50 rotates, for example, in the direction of arrow 96 with respect to a base drum 94 only so far as a hard stop 95 will allow. Such rotation causes misalignment of magnets 98a, 98b embedded in cable drum 50 with respect to sensors 100a, 100b embedded in base drum 94. Signals from sensors 100a, 100b are used to generate electrical inputs to steering motor 30, which in turn rotates steering shaft 17, thereby causing base drum 94 to rotate in the direction of arrow 102 and sensors 100a, 100b to realign with magnets 98a, 98b. Further inputs to the steering motor therefore cease. Springs 104a-104d may be provided in order to realign cable drum 50 with base drum 94 upon release of tension from cable strands 56a, 56b. Note that the locations of sensors 100a, 100b and magnets 98a, 98b could be swapped, such that sensors 100a, 100b are in cable drum 50, and magnets 98a, 98b are in base drum 94.

Note that although the above examples show steering to the left being accomplished by a heel-down position of the foot pad on the foot pedal 24 (see, e.g., FIG. 4B) and steering to the right being accomplished by a toe-down position of the foot pad (see, e.g., FIG. 6B), left and right steering could instead be accomplished by way of toe-down and heel-down positions of the foot pad, respectively. Additionally, note that although the Bowden cables 40a, 40b are connected to the cable drum 50 in a pull-pull configuration, a single-cable push-pull configuration could instead be used.

Thus, the present disclosure is of a trolling motor assembly 10 comprising a housing 204 containing a steering motor 30. In one example, the housing 204 is the control head 26. A steering shaft 17 is coupled to and configured to be rotated by the steering motor 30. A lower unit 14 is coupled to an end of the steering shaft 17 and is configured to rotate with the steering shaft 17. The housing 204 contains a moveable component 200, 200', 200'', 200''' that is actuated by mechanical inputs from a foot pedal 24 that is configured to be coupled to the trolling motor assembly 10. Actuation of the movable component 200, 200', 200'', 200''' generates electrical inputs to the steering motor 30, thereby activating the steering motor 30 to rotate the steering shaft 17 and the lower unit 14.

The trolling motor assembly 10 may further include a sensor 44a, 44b, 80a, 80b, 100a, 100b contained in the housing 204 that generates the electrical inputs to the steering motor 30 based on a position of the movable component 200, 200', 200'', 200'''. In some examples, as shown in FIGS. 4A, 4B, 5A, 5B and 6A, 6B the movable component 200, 200' comprises a bracket 36, 70a, 70b that is coupled to the housing 204 and movable with respect to the housing 204. Movement of a cable, such as Bowden cable 40a, 40b or 40a', 40b' connected to the foot pedal 24 causes movement of the bracket 36, 70a, 70b. In other examples, such as shown in FIGS. 7A-7C and 8A-8C, the movable component 200'', 200''' comprises a rotatable drum 78, 50 that is coupled to the steering shaft 17. In these examples, movement of a cable, such as Bowden cable 40a, 40b connected to the foot pedal 24 causes rotation of the drum 78, 50.

As noted in each of the examples above, the trolling motor assembly 10 may further comprise a resilient member (springs 48a, 48b, 92a, 92b, 104a-104d) between a stationary component 202, 202', 202'' (such as the stationary mounting structure 66 or sensor board 82) and the movable component 200, 200', 200'', 200''' (such as the bracket 36 or rotatable drum 78, 50) which resilient member returns the movable component 200, 200', 200'', 200''' (the bracket 36 or rotatable drum 78, 50) to a rest position upon cessation of the mechanical inputs from the foot pedal 24. Note that in any of the above examples, the springs could be provided inline with the magnets in order to reduce the size of the assembly.

Note that in each of the examples provided herein above, both first and second magnets are located on one of the stationary component 202, 202', 202'' and the moveable component 200, 200', 200'', 200''' and first and second Hall Effect sensors are located on the other of the stationary component 202, 202', 202'' and the movable component 200, 200', 200'', 200'''. The electrical inputs to the steering motor 30 may be an average of first and second signals output by the Hall Effect sensors, which may be determined by the motor controller. This allows the input signals to the steering motor 30 to be very precise. In other examples, only one magnet and one Hall Effect sensor are provided. As noted herein above, the position of the sensors and the magnets could be reversed with respect to one another. In still other examples, instead of providing Hall Effect sensors, force sensors could be used. In such examples, magnets would not be required.

By positioning of the electrical components in a housing 204 associated with the trolling motor assembly 10, such as within the control head 26, sensitive electronics and sensors are no longer located in the foot pedal 24, as with traditional electric-steer trolling motor systems. This provides a more protected and semi-sealed environment versus the harsh conditions of a boat deck or foot pedal well, which are prone to excess debris and pooling of water. Placing sensitive electronics in the trolling motor assembly 10 (rather than under a floating foot pad of the foot pedal) in addition to using Hall Effect sensors provides the system with a more precise steering response. The present system therefore has less "chuck" in the foot pedal prior 24 to responding to a steering input.

Direct coupling of the cable drum 50 to the steering shaft 17 provides a stiffer steering system feel, which provides to the user with the feel of a traditional cable-steer trolling motor system, while the steering motor 30 and associated transmission maintain the steered direction of the trolling motor assembly 10 even when the user does not have his or her foot on the foot pedal 24 by providing a holding torque to the steering shaft 17, which prevents water flow and propeller forces from changing the direction of the lower unit 14. At the same time, the foot pedal orientation is maintained in relation to the lower unit 14, so the user knows in which direction the lower unit 14 is pointed.

Figure 10:
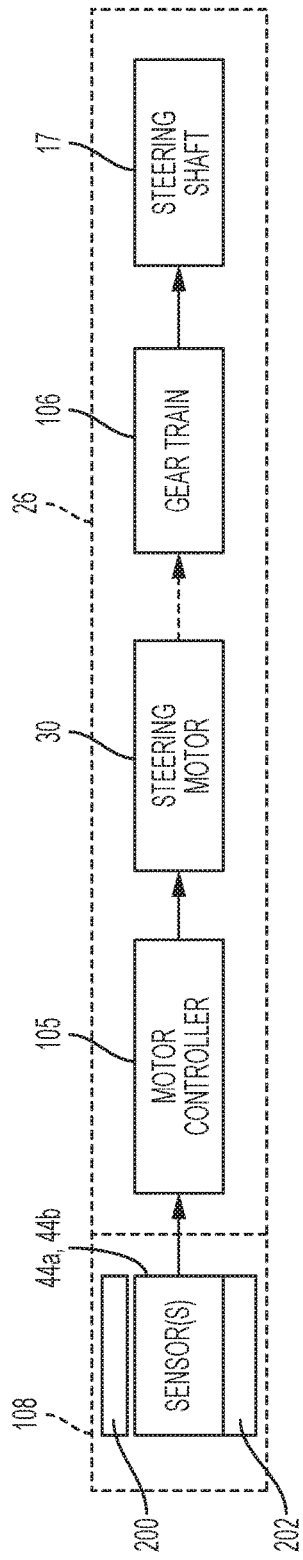
Figure 11:
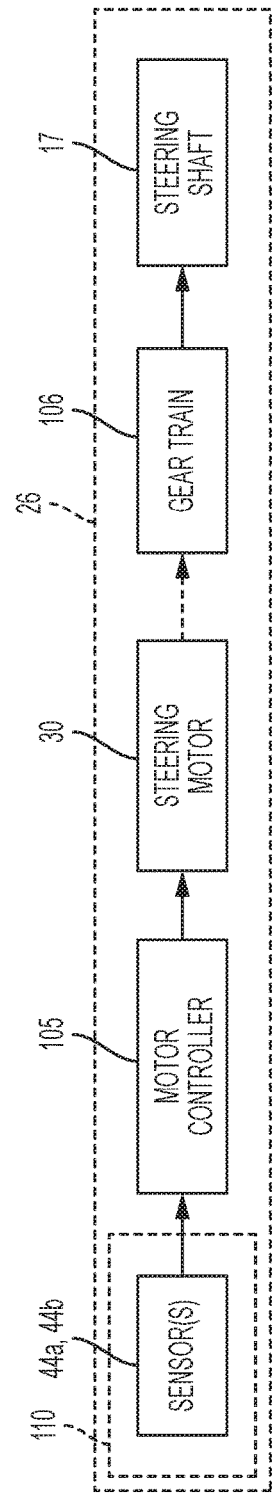
Figure 12:
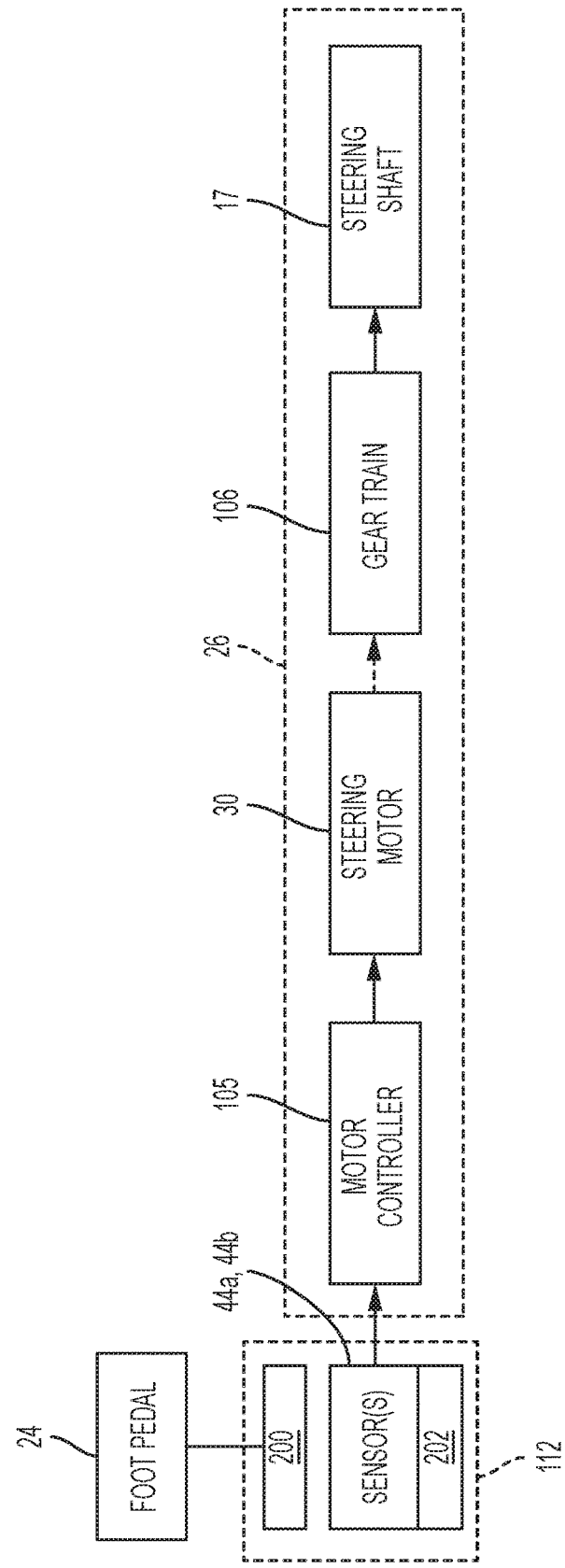

As noted herein above, the steering system, including moveable components 200, 200', 200'', 200''', stationary components 202, 202', 202'', and sensors 44a, 44b, can be nested directly in the base of the control head 26, such as mounted on the base block 26b and protected by the upper cover 26a (see FIGS. 2 and 3). Such an example is shown schematically in FIG. 9, in which the motor controller 105 and gear train 106 are also shown. In contrast, FIG. 10 shows an example in which the sensors 44a, 44b (and associated movable and stationary components 200, 202) are located in a separate housing 108, which is mounted to the outer surface of the control head 26. In the example of FIG. 11, the sensors 44a, 44b (and associated movable and stationary components 200, 202) are located in a carrier module 110, which can be pre-assembled and calibrated at a sub-assembly level prior to being nested in the control head 26.

In the above description, certain terms have been used for brevity, clarity, and understanding. No unnecessary limitations are to be inferred therefrom beyond the requirement of the prior art because such terms are used for descriptive purposes and are intended to be broadly construed. All embodiments in the present application and claimed below can be combined unless obviously not feasible to one having ordinary skill in the art. The different assemblies described herein may be used alone or in combination with other assemblies. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A trolling motor system for a watercraft comprising:
a trolling motor assembly coupled to the watercraft;

a foot pedal mechanically coupled to the trolling motor assembly such that mechanical inputs to the foot pedal cause movement of a moveable component of the trolling motor assembly; and a steering motor configured to steer the trolling motor assembly;

wherein the movement of the moveable component of the trolling motor assembly generates electrical inputs to the steering motor, thereby activating the steering motor to steer the trolling motor assembly;

wherein the movable component comprises at least one of a bracket and a drum; and further comprising a cable that couples the foot pedal to the at least one of the bracket and the drum, wherein movement of the cable results in movement of the at least one of the bracket and the drum.

2. The trolling motor system of claim 1, wherein the trolling motor assembly includes a control head, a lower unit, and a steering shaft connecting the control head to the lower unit; and wherein the steering motor is coupled to the steering shaft and configured to rotate the steering shaft and thereby rotate the lower unit.

3. The trolling motor system of claim 2, wherein the foot pedal is mechanically coupled to the steering shaft by way of the cable, such that rotation of the steering shaft provides mechanical feedback to the foot pedal.

4. The trolling motor system of claim 1, wherein the trolling motor assembly includes a control head, and wherein the moveable component is located in the control head.

5. The trolling motor system of claim 4, wherein the moveable component comprises the bracket, which is coupled to the control head and moveable with respect to the control head; and further comprising a sensor in the control head that generates the electrical inputs to the steering motor based on a position of the bracket.

6. The trolling motor system of claim 4, wherein the trolling motor assembly includes a lower unit and a steering shaft connecting the control head to the lower unit; and wherein the moveable component comprises the drum, which is coupled to and rotates with the steering shaft; and further comprising a sensor in the control head that generates the electrical inputs to the steering motor based on a rotational position of the drum.

7. The trolling motor system of claim 1, further comprising:

a stationary component with respect to which the moveable component moves;

a Hall effect sensor on one of the stationary component and the moveable component; and a magnet on the other of the stationary component and the moveable component;

wherein the Hall effect sensor generates the electrical inputs to the steering motor based on a relative positioning of the Hall effect sensor and the magnet.

8. A trolling motor assembly comprising:
a housing containing a steering motor;
a steering shaft coupled to and configured to be rotated by the steering motor; and
a lower unit coupled to an end of the steering shaft and configured to rotate with the steering shaft;

wherein the housing contains a moveable component that is actuated by mechanical inputs from a foot pedal that is configured to be coupled to the trolling motor assembly; and wherein actuation of the moveable component generates electrical inputs to the steering motor, thereby activating the steering motor to rotate the steering shaft and the lower unit.

9. The trolling motor assembly of claim 8, further comprising a sensor contained in the housing that generates the electrical inputs to the steering motor based on a position of the moveable component.

10. The trolling motor assembly of claim 9, wherein the moveable component comprises a bracket that is coupled to the housing and moveable with respect to the housing.

11. The trolling motor assembly of claim 10, wherein movement of a cable connected to the foot pedal causes movement of the bracket.

12. The trolling motor assembly of claim 9, wherein the moveable component comprises a rotatable drum that is coupled to the steering shaft.

13. The trolling motor assembly of claim 12, wherein movement of a cable connected to the foot pedal causes rotation of the drum.

14. The trolling motor assembly of claim 8, further comprising:

a stationary component contained in the housing and with respect to which the moveable component moves;

a magnet on one of the stationary component and the moveable component; and a Hall effect sensor on the other of the stationary component and the moveable component;

wherein the Hall effect sensor generates the electrical inputs to the steering motor based on a relative positioning of the Hall effect sensor and the magnet.

15. The trolling motor assembly of claim 14, further comprising a resilient member between the stationary component and the moveable component, which resilient member returns the moveable component to a rest position upon cessation of the mechanical inputs from the foot pedal.

16. The trolling motor assembly of claim 14, further comprising:

a second magnet on the one of the stationary component and the moveable component; and a second Hall effect sensor on the other of the stationary component and the moveable component;

wherein the electrical inputs to the steering motor are an average of first and second signals output by the Hall effect sensors.

17. The trolling motor assembly of claim 8, wherein the housing is a control head located at an opposite end of the steering shaft from the lower unit.

18. A trolling motor assembly comprising:
a housing containing a steering motor;
a steering shaft coupled to and configured to be rotated by the steering motor; and
a lower unit coupled to an end of the steering shaft and configured to rotate with the steering shaft;

wherein the housing contains at least one of a bracket and a drum that is moved by mechanical inputs from a foot pedal that is configured to be coupled to the trolling motor assembly; and wherein movement of the at least one of the bracket and the drum generates electrical inputs to the steering motor, thereby activating the steering motor to rotate the steering shaft and the lower unit.

19. The trolling motor assembly of claim 18, wherein the bracket is coupled to the housing and moveable with respect to the housing, and wherein movement of a cable connected to the foot pedal causes movement of the bracket.

20. The trolling motor assembly of claim 18, further comprising a sensor contained in the housing that generates the electrical inputs to the steering motor based on a position of the at least one of the bracket and the drum.

* * * * *